Jan. 19, 1926.

H. B. LINDHORST 1,570,359

ANTISKID ATTACHMENT FOR AUTOMOBILE WHEELS

Filed June 29, 1925

INVENTOR
H. B. LINDHORST
BY
ATTORNEYS

Patented Jan. 19, 1926.

1,570,359

UNITED STATES PATENT OFFICE.

HENRY BENNARD LINDHORST, OF SPRINGFIELD, MISSOURI.

ANTISKID ATTACHMENT FOR AUTOMOBILE WHEELS.

Application filed June 29, 1925. Serial No. 40,315.

*To all whom it may concern:*

Be it known that I, HENRY B. LINDHORST, a citizen of the United States, and a resident of Springfield, in the county of Greene and State of Missouri, have invented a new and useful Improvement in Antiskid Attachments for Automobile Wheels, of which the following is a full, clear, and exact description.

My invention relates to improvements in anti-skid attachments for automobile wheels, and it consists in the combinations, constructions, and arrangements herein described and claimed.

An object of my invention is to provide an anti-skid attachment for automobile wheels which performs the twofold function of preventing the wheel from skidding upon the road or pavement, and also provides an increase in the contacting portions of the wheel and the road, thereby affording adequate traction, as in mud, sand or other loose road bed.

A further object of my invention is to provide a device of the type described which may be quickly and easily attached and detached from a standard automobile wheel, without the necessity of removing the standard pneumatic tire therefrom.

A further object of my invention is to provide a device of the type described which is simple in construction, which is durable, and which is thoroughly practical for the purpose intended.

Other objects and advantages will appear in the following specification, and the novel features of the invention will be particularly pointed out in the appended claims.

My invention is illustrated in the accompanying drawing forming part of this application, in which—

Figure 1:
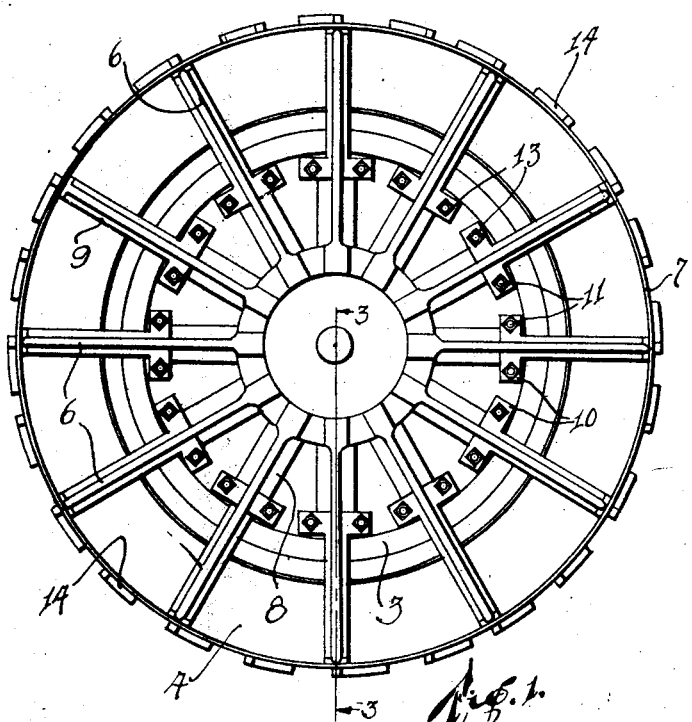
Figure 2:
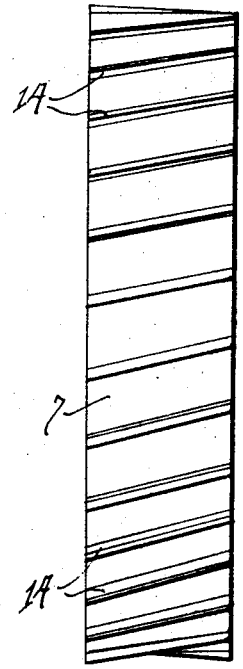
Figure 3:
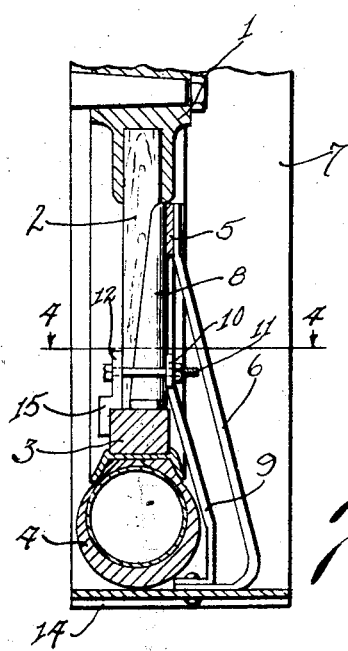
Figure 4:
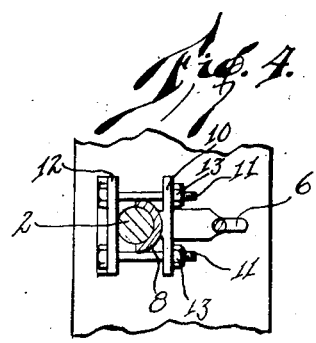

Figure 1 is a plan view of a vehicle wheel equipped with my improved anti-skid attachment, Figure 2 is a side elevation of the device illustrated in Figure 1, Figure 3 is a sectional view along the line 3—3 of Fig. 1, and Figure 4 is a sectional view along the line 4—4 of Fig. 3.

In carrying out my invention I make use of a standard type of motor vehicle wheel comprising a hub member 1, spokes 2, a felly 3, and a pneumatic tire 4 mounted upon the felly 3.

My improved anti-skid attachment consists in a substantially flat metal ring 5 which is arranged for disposition concentric with the hub member 1 adjacent to the outer face of the hub. The ring member 5 has a plurality of radially extending rods 6 having the contour shown in Figure 3, which extend to a point beyond the peripheral surface of the tire 4. A substantially flat rim tread member of metal 7 is secured to the outer ends of the rods 6. The rods 6 are secured to the ring 5 and the rim 7 by welding, though rivets may be employed if desired.

A plurality of spoke engaging members 8 are provided which are substantially semi-circular in cross section (see Figure 4) one for each of the spokes 2. These members are secured at their innermost ends to the inner walls of the ring 5 by a welding process or the like, and extend to a point adjacent to the felly 3.

A plurality of plates 9 are secured one to each of the members 8 at the outermost ends of the members, and extend outwardly and are secured to the outermost ends of the rods 6 and to the rim 7 by means of spot welding, riveting, or the like.

Means for securing the members 8 in close engagement with the spokes 2, and hence the entire device upon the wheel, is provided in an enlarged portion 10 of the plates 9 through which bolts 11 are projected. These bolts 11 are disposed one on either side of the members 8 and are projected through metal clips 12 which are permitted to bear against the rear portion of the spokes 2 so that when nuts 13, associated with the bolts 11, are tightened, the plates 12 and the members 8 are drawn into close engagement with the spokes 2, thus securing the device against movement relative to the wheel. A plurality of angular blades 14 are disposed across the peripheral wall of the rim 7 so as to provide adequate traction surface, as in moving through loose earth, sand and the like.

From the foregoing description of the various parts of the device the operation thereof may be readily understood. In applying my improved anti-skid attachment to a vehicle wheel no special tools are necessary, nor is it necessary to reconstruct in any way a standard wheel or its tire. Furthermore it is unnecessary to remove the tire from its wheel. The device is placed in the position shown in Figure 3 and the plates 12 are moved into engagement with the spokes 2 and with the felly 3, due to the peculiar structure of the plates as shown at 15 (see Figure 3) and the nuts 13 on the bolts 11 are tightened.

The device is now ready for use, and the vehicle may be moved over the road and over mud, loose sand and the like, without any possibility of the wheel becoming bogged, due to the large traction surface and to the presence of the blades 14.

I claim:

1. The combination with a vehicle wheel having spokes, a felly, and a tire mounted thereupon, of a substantially broad annular tread member arranged for disposal about and concentric with the tire on said wheel, and means including members conforming in contour to the spokes of the wheel for partially encompassing the spokes of the wheel, and clamping members associated with the spoke engaging members for securing the rim against unintentional removal from the wheel.

2. The combination with a vehicle wheel having spokes, a felly and a tire mounted thereupon, of a substantially broad, annular rim member, a substantially flat ring, a plurality of radially extending rods carried by the ring secured at their outermost ends to the rim member, and means associated with the ring for engaging with said spokes, whereby the rim may be held against unintentional movement relative to the wheel in a position concentric with the tire on said wheel.

HENRY BENNARD LINDHORST.